(12) United States Patent
Chapet

(10) Patent No.: US 7,931,204 B2
(45) Date of Patent: Apr. 26, 2011

(54) ELECTRONIC MICROCHIP TOKEN AND ITS FABRICATION PROCESS

(75) Inventor: Pierre Chapet, Beaune (FR)

(73) Assignee: Gaming Partners International, Savigny les Beaune (FR)

( * ) Notice: Subject to any disclaimer, the term of this patent is extended or adjusted under 35 U.S.C. 154(b) by 997 days.

(21) Appl. No.: 10/590,208

(22) PCT Filed: Jun. 30, 2006

(86) PCT No.: PCT/FR2006/001557
§ 371 (c)(1),
(2), (4) Date: Apr. 2, 2007

(87) PCT Pub. No.: WO02/47023
PCT Pub. Date: Jun. 13, 2002

(65) Prior Publication Data
US 2007/0278314 A1 Dec. 6, 2007

(30) Foreign Application Priority Data
Aug. 7, 2005 (FR) ...................................... 05 07313

(51) Int. Cl.
*G06K 19/06* (2006.01)
(52) U.S. Cl. ........................................ 235/492; 235/487
(58) Field of Classification Search .................. 235/492, 235/487
See application file for complete search history.

(56) References Cited

U.S. PATENT DOCUMENTS

| | | | |
|---|---|---|---|
| 1,624,335 A | 4/1927 | Green | |
| 1,935,308 A | 11/1933 | Baltzley | |
| 2,410,845 A | 11/1946 | Snell et al. | |
| 2,450,997 A | 10/1948 | Shann | |
| 2,544,118 A | 3/1951 | Went | |
| 2,836,911 A | 6/1958 | Priesneyer | |
| 2,983,354 A | 5/1961 | Ember et al. | |
| 3,034,643 A | 5/1962 | Keller et al. | |
| 3,295,651 A | 1/1967 | Klackowski et al. | |
| 3,306,462 A | 2/1967 | Cruz | |
| 3,439,439 A | 4/1969 | Stimson | |
| 3,670,524 A | 6/1972 | Korwin | |

(Continued)

FOREIGN PATENT DOCUMENTS

AU  B-68546/90  7/1991

(Continued)

*Primary Examiner* — Daniel A Hess
*Assistant Examiner* — Paultep Savusdiphol
(74) *Attorney, Agent, or Firm* — Brownstein Hyatt Farber Schreck, LLP

(57) ABSTRACT

A generally disc-shaped token of the type having a body produced by multiple injection of plastic material and method of fabricating the same, which includes a core produced by a first injection of plastic material and having a central portion defining the central portion of the body of the token and a peripheral portion with radial projections defining at least part of the edge of the body of the token. The core incorporates an insert including a contactless electronic microchip identification device buried in the central portion during the first injection and retained at its periphery by projections or fingers attached to the injection mold and defining openings in the core. The body of the token includes a covering layer produced by a second injection of plastic material around the peripheral portion of the core to produce in conjunction with the core the whole of the edge and the annular peripheral portion of the body of the token. A decorated label is fixed to each face of the token. The token may be used as a gaming chip or a casino chip.

24 Claims, 4 Drawing Sheets

U.S. PATENT DOCUMENTS

| | | |
|---|---|---|
| 3,766,452 A | 10/1973 | Burpee et al. |
| 3,862,400 A | 1/1975 | Thomson |
| 3,882,482 A | 5/1975 | Green et al. |
| 3,926,291 A | 12/1975 | Burke et al. |
| 3,936,878 A | 2/1976 | Chrysler |
| 3,953,932 A | 5/1976 | Graves |
| 4,026,309 A | 5/1977 | Howard |
| 4,183,432 A | 1/1980 | Lemaire |
| 4,277,774 A | 7/1981 | Fujii et al. |
| 4,283,709 A | 8/1981 | Lucero et al. |
| 4,371,071 A | 2/1983 | Abedor et al. |
| 4,373,135 A | 2/1983 | Mohan et al. |
| 4,395,043 A | 7/1983 | Garcione |
| 4,399,910 A | 8/1983 | Gutentag |
| 4,435,911 A | 3/1984 | Jones |
| 4,511,796 A | 4/1985 | Aigo |
| 4,570,058 A | 2/1986 | Havassy |
| 4,637,613 A | 1/1987 | Bishop |
| 4,638,171 A | 1/1987 | Gassmann |
| 4,674,618 A | 6/1987 | Eglise et al. |
| 4,675,973 A | 6/1987 | Siu |
| 4,703,165 A | 10/1987 | Colodner et al. |
| 4,725,924 A | 2/1988 | Juan |
| 4,755,941 A | 7/1988 | Bacchi |
| 4,814,589 A | 3/1989 | Storch et al. |
| 4,818,855 A | 4/1989 | Mongeon et al. |
| 4,827,640 A | 5/1989 | Jones |
| 4,838,404 A | 6/1989 | Smith et al. |
| 4,926,996 A | 5/1990 | Eglise et al. |
| 4,969,549 A | 11/1990 | Eglise |
| 4,973,524 A | 11/1990 | Huebner et al. |
| 4,999,742 A | 3/1991 | Stampfli |
| 5,007,641 A | 4/1991 | Seidman |
| 5,038,022 A | 8/1991 | Lucero |
| 5,094,922 A | 3/1992 | Ielpo et al. |
| 5,103,081 A | 4/1992 | Fisher et al. |
| 5,159,549 A | 10/1992 | Hallman, Jr. et al. |
| 5,166,502 A | 11/1992 | Rendleman et al. |
| 5,179,517 A | 1/1993 | Sarbin et al. |
| 5,216,234 A | 6/1993 | Bell |
| 5,265,874 A | 11/1993 | Dickinson et al. |
| 5,283,422 A | 2/1994 | Storch et al. |
| 5,361,885 A | 11/1994 | Modler |
| 5,367,148 A | 11/1994 | Storch et al. |
| 5,399,847 A | 3/1995 | Droz |
| 5,406,264 A | 4/1995 | Plonsky et al. |
| 5,451,756 A | 9/1995 | Holzer et al. |
| 5,487,459 A | 1/1996 | Farmont |
| 5,498,859 A | 3/1996 | Farmont |
| 5,561,548 A | 10/1996 | Engle |
| 5,568,666 A | 10/1996 | Seibert |
| 5,575,374 A | 11/1996 | Orus et al. |
| 5,651,548 A | 7/1997 | French et al. |
| 5,673,502 A | 10/1997 | Caterbone |
| 5,673,503 A | 10/1997 | Rendleman |
| 5,692,748 A | 12/1997 | Frisco et al. |
| 5,735,742 A | 4/1998 | French |
| 5,770,533 A | 6/1998 | Franchi |
| 5,794,532 A | 8/1998 | Gassies et al. |
| 5,895,321 A | 4/1999 | Gassies et al. |
| 5,941,769 A | 8/1999 | Order |
| 5,973,599 A | 10/1999 | Nicholson et al. |
| 6,021,949 A | 2/2000 | Boiron |
| 6,176,185 B1 | 1/2001 | Charlier et al. |
| 6,199,862 B1 | 3/2001 | Long et al. |
| 6,210,267 B1 | 4/2001 | Long et al. |
| 6,264,109 B1 | 7/2001 | Charlier et al. |
| 6,267,671 B1 | 7/2001 | Hogan |
| 6,296,190 B1 | 10/2001 | Rendleman |
| 6,402,142 B1 | 6/2002 | Warren |
| 6,467,413 B1 | 10/2002 | Charlier et al. |
| 6,508,466 B1 | 1/2003 | Rendleman |
| 6,581,747 B1 | 6/2003 | Charlier et al. |
| 6,659,875 B2 | 12/2003 | Purton |
| 6,834,855 B2 | 12/2004 | Mancuso |
| 6,845,905 B2 | 1/2005 | Blad et al. |
| 7,100,501 B2 | 9/2006 | Tollhupp |
| 2003/0218299 A1 | 11/2003 | Zapata |
| 2004/0087375 A1 | 5/2004 | Gelinotte |
| 2004/0229682 A1 | 11/2004 | Gelinotte |
| 2006/0273181 A1 | 12/2006 | Charlier et al. |
| 2007/0105616 A1 | 5/2007 | Chapet et al. |

FOREIGN PATENT DOCUMENTS

| | | |
|---|---|---|
| CA | 2249876 | 4/1999 |
| CA | 2306226 | 4/1999 |
| DE | 8 909 783 | 10/1990 |
| DE | 9 300 173 | 4/1993 |
| DE | 4 400 744 | 8/1994 |
| DE | 4 311 561 | 10/1994 |
| DE | 4 439 502 | 9/1995 |
| DE | 4 440 744 | 5/1996 |
| EP | 0 063 103 | 10/1982 |
| EP | 0 147 099 | 7/1985 |
| EP | 0 232 174 | 8/1987 |
| EP | 0 266 497 | 5/1988 |
| EP | 0 360 613 | 3/1990 |
| EP | 0 376 062 | 7/1990 |
| EP | 0 424 355 | 4/1991 |
| EP | 0 436 497 | 7/1991 |
| EP | 0 436 502 | 7/1991 |
| EP | 0 444 373 | 9/1991 |
| EP | 0 555 683 | 8/1993 |
| EP | 0 564 051 | 10/1993 |
| EP | 0 570 874 | 11/1993 |
| EP | 0 613 103 | 8/1994 |
| EP | 0 650 148 | 4/1995 |
| EP | 0 694 872 | 1/1996 |
| EP | 0 740 818 | 11/1996 |
| EP | 0 769 770 | 4/1997 |
| EP | 0 790 848 | 8/1997 |
| EP | 0 874 336 | 10/1998 |
| FR | 1 001 412 | 2/1952 |
| FR | 2 554 293 | 5/1985 |
| FR | 2 644 268 | 9/1990 |
| FR | 2 656 538 | 7/1991 |
| FR | 2 663 145 | 12/1991 |
| FR | 2 727 032 | 5/1996 |
| FR | 2 727 548 | 5/1996 |
| FR | 2 739 708 | 4/1997 |
| FR | 2 745 103 | 8/1997 |
| FR | 2 749 093 | 11/1997 |
| FR | 2 817 373 | 5/2002 |
| FR | 2 833 102 | 6/2003 |
| GB | 1 599 120 | 9/1981 |
| GB | 2 075 732 | 11/1981 |
| GB | 2 077 556 | 12/1981 |
| GB | 2 149 623 | 6/1985 |
| GB | 2 153 128 | 8/1985 |
| GB | 2 180 086 | 3/1987 |
| GB | 2 191 368 | 12/1987 |
| GB | 2 229 845 | 10/1990 |
| WO | WO 87/04551 | 7/1987 |
| WO | WO 88/01082 | 2/1988 |
| WO | WO 91/06068 | 5/1991 |
| WO | WO 92/21105 | 11/1992 |
| WO | WO 94/16407 | 7/1994 |
| WO | 94/18700 | 8/1994 |
| WO | WO 95/08164 | 3/1995 |
| WO | WO 96/07153 | 3/1996 |
| WO | WO 96/14115 | 5/1996 |
| WO | WO 96/17329 | 6/1996 |
| WO | WO 96/36253 | 11/1996 |
| WO | WO 97/27526 | 7/1997 |
| WO | WO 97/30414 | 8/1997 |
| WO | 99/19851 | 4/1999 |
| WO | WO 99/25439 | 5/1999 |
| WO | WO 01/08080 | 2/2001 |
| WO | WO 02/47023 | 6/2002 |
| WO | WO 03/045661 A1 | 6/2003 |
| WO | WO 03/049048 | 6/2003 |
| WO | WO 2004/102731 | 11/2004 |
| WO | WO 2005/069209 | 7/2005 |
| WO | 2006/106192 | 10/2006 |
| WO | 2007/006893 | 1/2007 |
| ZA | 9010453 | 10/1991 |

ELECTRONIC MICROCHIP TOKEN AND ITS FABRICATION PROCESS

The present invention relates to the incorporation of contactless electronic microchip identification devices into generally disc-shaped tokens having a plastic material body, in particular gaming chips or casino chips. The present invention also relates to a method of making thereof.

Gaming chips are generally fabricated from scratch-resistant rigid plastic material in order to obtain an overall robust structure. Gaming chips feature varied patterns in terms of design and color to form a more or less complex decoration and to reduce the risk of fraudulent reproduction and/or counterfeiting. Moreover, the use of color codes and colored patterns, in particular on the edge of the gaming chips, combined with the value of the chips, enables croupiers and other users to identify and/or sort the chips quickly by glancing at them, even if the chips are stacked.

U.S. Pat. No. 3,953,932 (Graves) describes a disc-shaped token with indentations at the center of the edge and the body whereof includes an annular core produced by a first injection of plastic material and a covering layer produced by a second injection of plastic material, with a cavity on each face into which a label carrying a decoration is fixed.

The Applicant's European patent EP 0444 373 describes a casino chip known as a 'no value' chip in the form of a disc with indentations at the center of the edge and the body whereof includes a thin circular metal plate forming a ballast over which a plastic material core is produced by a first injection, the peripheral portion of which is covered by a layer produced by a second injection of plastic material, with a double layer of plastic material at the periphery of the metal plate, the chip having on each face a cavity into which a label carrying a decoration is fixed.

To combat fraud and to facilitate counting and tracing gaming chips, in particular in a gaming room or a casino, chips have been proposed that integrate inserts consisting of an electronic circuit module including a memory storing information associated with the chip, for example its identification number or code and/or its face value. Communication between the electronic circuit module integrated into the chip and its external read/write station is usually effected without contact, using a contactless electronic microchip identification device including an electronic circuit or microchip associated with an antenna, generally a circular loop antenna, for "contactless" communication with the read/write station using the radio-frequency identification (RFID) technique.

U.S. Pat. No. 4,969,549 (Eglise) describes a payment token that can be used in public telephone installations and in which the electronic circuit and its antenna are encapsulated in a plastic material disc of small diameter (from 20 to 30 mm), the token having in addition a conductive axial core through its center, although the fabrication process is not specified.

U.S. Pat. No. 5,166,502 (Rendelman) describes a casino chip in which the antenna and the electronic circuit are inside a metal ballast between two face plates at the center of an injected plastic material ring, everything being held in place by epoxy resin and by a second injection covering the ring and the periphery of the plates. This chip, which is of complex structure and costly to fabricate, does not offer all of the required security in that it is possible to access the electronic circuit simply by cutting one face plate without completely destroying the structure of the chip and rendering it unusable.

U.S. Pat. No. 6,296,190 (Rendelman) describes a casino chip in which the antenna and the electronic circuit are inside a plastic material cup closed by a lid secured by epoxy resin, the cup itself being placed at the center of an injected plastic material ring, everything being held in place by a second injection covering the ring and the periphery of the cup (without covering at least a portion of the lid of the cup). The chip is completed by fitting two face plates retained by an adhesive. This chip is of complex structure and costly to fabricate and does not offer all the required security in that it is possible to access the electronic circuit without completely destroying the structure of the chip and rendering it unusable merely by cutting one face plate and removing the lid from the cup.

The Applicants European patent EP 0 694 872 describes a casino chip whose body includes a central disc consisting of a rigid plastic material shell charged with metal particles and carrying an electronic identification device and an annular ring of injected plastic material around the disc. In a first variant, the one-piece shell is injected around a protective casing into which the electronic device is integrated beforehand. In a second variant, the shell is produced by attaching a cover and a hollow injected plastic material disc after placing the electronic identification device. Although giving good results, this electronic identification chip fabrication technique has limitations, in particular with regard to the total thickness of a casino chip, as it is difficult to reduce the thickness below 3.3 mm (for a diameter that is generally from 39 to 50 mm) and even virtually impossible to achieve thicknesses of the order of 3 mm, and with regard to fabrication costs, given the separate production of the central disc and, in the case of a chip with a two-color edge, the necessity to perform three separate injections of plastic material.

The Applicant's European patents EP 0 796 049 and EP 0 973 420 disclose disc-shaped chips whose body consists of two injected plastic material half-discs with axial projections defining a housing at the center of the chip for an electronic identifier, the two half-discs being fastened together by injecting a plastic material seal from the edge. Some variants of this technique produce electronic identification chips with a two-color edge with only two injections of plastic material, but this does not solve the problem of reducing the thickness of the chip for casino chips with a diameter from 39 to 50 mm and is not really suitable for the fabrication of chips with a two-color edge comprising colored stripes perpendicular to the edge (parallel to the axis of the chip).

According to an aspect of the invention, there are provided generally disc-shaped tokens incorporating a contactless electronic identification device, in particular casino chips, an injection-molded plastic material body whereof has a structure that is simpler to fabricate and facilitates the fitting of the electronic identification device as well as offering the required protection, in particular a structure adapted to the production of thinner tokens and/or adapted to the production of tokens with a multi-colored edge.

To this end, the invention proposes a generally disc-shaped token of the type having a body produced by multiple injection of plastic material and a method of making thereof, the token comprising at least:

a generally disc-shaped core of the body of the token produced by a first injection of plastic material and having a central portion defining the central portion of the body of said token and a peripheral portion defining at least part of the edge of said body of the token; and a covering layer produced by a second injection of plastic material around the peripheral portion of the core to produce in conjunction with the core all or almost all of the edge and of the annular peripheral portion of the body of the token, which is characterized in that the core of the token incorporates an insert embedded in the plastic material of the central portion of said body during the first injection and including a contactless electronic microchip identification device.

Thus the structure of the body of the token produces the shell protecting the electronic identification device and at least part of the edge of the token in a single injection. This makes it possible to reduce the number of injections of plastic material necessary to fabricate the body, in particular in the case of the body having a multi-colored edge with colored stripes parallel to the axis of the token, and/or to reduce the thickness of the central portion of the token and thus the total thickness of the token if necessary. Furthermore, molding over the insert in the first injection results in improved retention thereof over virtually the whole of its two faces compared to the peripheral retention obtained with the structure described in European patent EP 0 444 373 referred to above. This improved retention makes it impossible for a fraudster to replace the insert without completely destroying the token and rendering it unusable. Finally, placing the contactless electronic microchip insert in the middle of the thickness of the core of the token facilitates contactless radio-frequency (RFID) reading of stacks or columns of tokens.

All variants and embodiments of the token of the invention as defined above constitute a gaming chip or a casino chip.

In a first embodiment of the token of the invention it is advantageous if in the first injection the core defines at least part of the annular peripheral portion of the token. This produces patterns on the edge and on the faces of the token that are injection-molded into the mass of the body of the token and in particular extend the full height of the edge.

In another embodiment of the token of the invention, in the first injection the core defines at least part of the annular peripheral portion of the token and the edge of the token by way of radial peripheral projections that may be grouped, are preferably evenly distributed in the circumferential direction and extend on either side of said body and axially over the edge. This embodiment is highly beneficial for producing tokens with an edge carrying a color code. In particular, in another embodiment, in conjunction with the core the covering layer defines the annular peripheral portion and the edge of the body of the token except for housings provided with injected plastic material edge inclusions produced by at least one complementary injection.

In another embodiment of the token of the invention, the peripheral region of the central portion of the core includes a plurality of openings into which project portions of the insert including said electronic microchip identification device. This leaves passages for projections associated with the two shells of the injection mold defining the core and adapted to position and to retain the electronic identifier during injection of the core. It is advantageous if the core includes at least three openings evenly distributed in the circumferential direction at the periphery of the central portion of the core. It is also advantageous if said portions of the insert projecting through openings in the core are sufficiently strong to hold the insert in place during injection of the core of the body of the token. The center of the central portion of the core optionally has at least one recess on at least one of its faces. This axial recess in the faces of the token prevents deformation and/or change of the electronic identifier insert during injection of the core, and in particular makes it possible to support the center of the electronic identification device carrying the electronic circuit with a small clearance so there is no risk of pinching it.

To facilitate injection of the covering layer and anchoring it to the core the internal portion of said annular peripheral portion of the core includes a circular groove including through passages that are preferably evenly distributed in the circumferential direction. It is advantageous if the openings and/or any recesses in the faces of the token and/or the through passages are filled with plastic material by said second injection.

In another embodiment of the token of the invention, the body of the token has on each face a cavity into which is fixed a label carrying a decoration and/or a mark and/or a hologram.

The body of the token of the invention may be produced using colored plastic materials, optionally of different colors, obtained from at least one basic polymer selected from:
  polymethyl methacrylate (PMMA);
  acrylonitrile-butadiene-styrene (ABS);
  polyamides and copolymers thereof;
  polyacetal and acetal copolymers (POM/polyoxymethylene);
  phenylene polysulfide (PPS);
  poly(alkylenes terephthalate), in particular polybutylene terephthalate (PBT);
  thermoplastic polyurethanes (PUR);
  vinyl polymers, polyvinyl chloride (PVC);
  polyolefins, in particular polyethylenes (PE) and polypropylenes.

The invention also relates to a method of fabricating the body of any of the above embodiments of a token according to the invention including at least the following operations:
  placing an insert including a contactless electronic microchip identification device in a first injection mold two half-shells whereof define a first imprint corresponding to a generally disc-shaped core of the body of the token;
  holding said insert at the center of the first imprint by axially clamping it between the two half-shells of the first mold;
  injecting the core of the token;
  placing the core of the token in a second injection mold, two half-shells whereof define a second imprint corresponding to the whole or almost the whole of the body of the token;
  holding said core at the center of the second imprint by axially clamping the central portion of the core between the two half-shells of the second mold;
  injecting the covering layer;
  where applicable, further injection(s) of edge inclusions to complete the body of the token, if necessary; and
  optionally machining the body of the token to finish the edge of the token.

It is advantageous if the clamping during the first injection and/or the second injection is realized at the peripheral area of the central portion of the core of the token.

In another embodiment of the token of the invention, in particular a gaming chip or casino chip, the generally disc-shaped token is characterized in that it includes a body produced by a single injection of plastic material incorporating an insert that is buried during injection in the plastic material of the central portion of the body and includes a contactless electronic microchip identification device, in that the periphery of the central body portion includes a plurality of openings into which project portions of the insert including the electronic microchip identification device, and in that the portions of the insert projecting through the openings are sufficiently strong to hold the insert in place during injection of the body of the token. It is advantageous if the central portion of the body of the token has on each face a cavity in which is disposed and fixed a label carrying a decoration and/or a mark and/or a hologram, the openings being optionally blocked beforehand, for example with epoxy resin.

The invention also relates to a disc-shaped token, in particular a gaming chip or a casino chip, that includes a body produced by injection of plastic material and having a diameter greater than or equal to 39 mm and a maximum thickness that does not exceed 3.3 mm, the thickness of the central portion of the body being of the order of 2.5 mm.

Other objects, features and advantages of the invention will become apparent on reading the following description of two preferred embodiments of the invention, which are described by way of nonlimiting example and with reference to the appended drawings, in which.

Figure 1A:
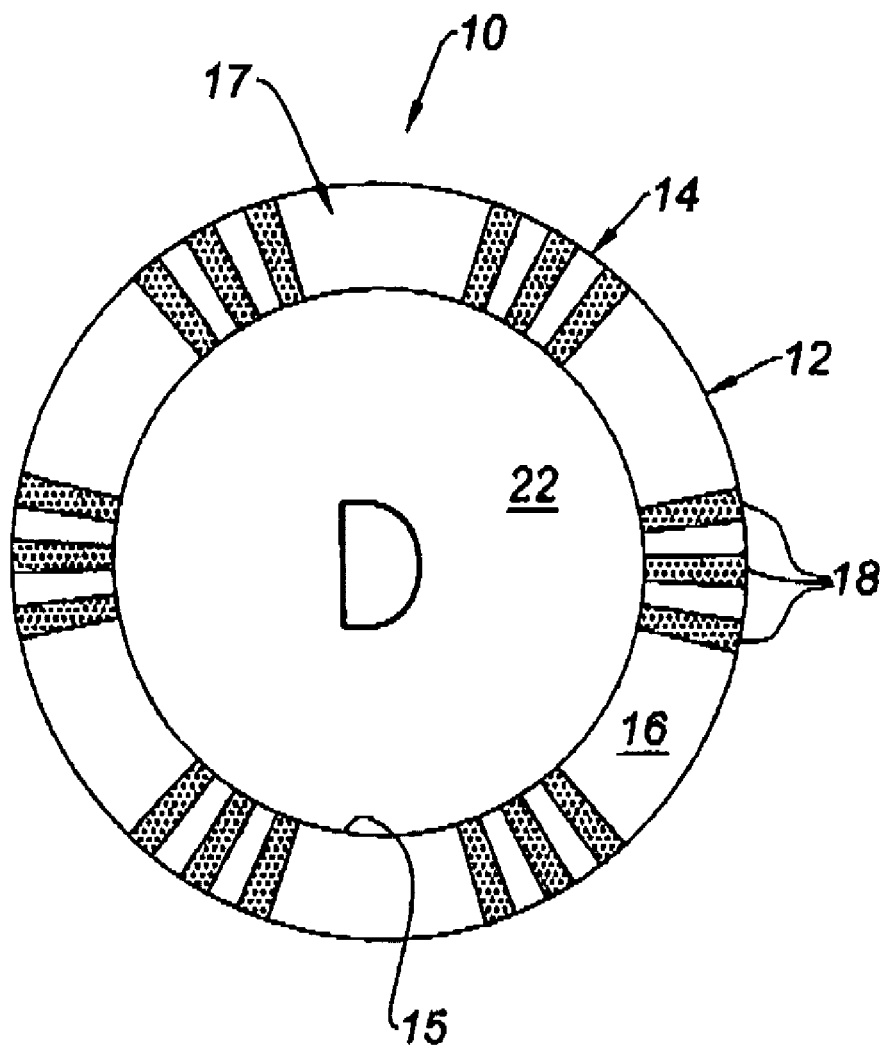
FIGS. 1a and 1b are respectively a diagrammatic front view and a side view showing the edge of a gaming chip according to a first embodiment of the invention produced by two injections of colored plastic material.
Figure 1B:
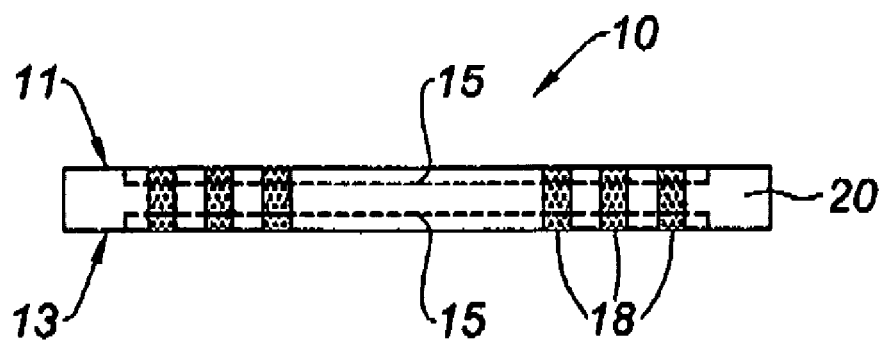

In a first embodiment of the invention, the multiple injection gaming chip 10 in the form of a colored plastic material disc shown in FIGS. 1a and 1b has a body 12 consisting of a core 14 carrying an insert including a contactless electronic microchip identification device (see FIGS. 2 and 3) and produced by a first injection of plastic material of a first color (represented diagrammatically in dotted line to clarify FIGS. 1a-1b and 4) and having its peripheral portion covered with a covering layer 16 produced by a second injection of plastic material of a different color, the core 14 carrying at its periphery radially and/or laterally extending projections 18 that are visible flush with the surface of the covering layer 16 on the faces 11 and 13 and on the edge 20 of the chip. Here the three projections 18 are parallel to the axis of the chip 10 (perpendicular to the edge 20 to form a two-color pattern with five colored stripes). Thus to resist counterfeiting it is possible to produce colored face and/or edge decorations within the mass of the body of the chip that can in particular be distinguished visually and to associate with these decorations or patterns of colored stripes a chip code as a function of the chip value, for example. These patterns are conventionally repeated (for example six or eight times) and evenly distributed in the circumferential direction, in particular on the edge 20, so that the chip can be identified visually or optically regardless of its orientation.

The chip is completed by fixing into the shallow central cavity 15 on each face 11 and 13 a label 22 carrying a decoration D (for example a printed or screen-printed decoration) and/or a mark and/or a hologram.

Of course, the invention is not limited to edge patterns in the form of stripes perpendicular to the edge, or to patterns of stripes of color with three projections 18 (variants of chips according to the invention have patterns with one to four projections). Nor is the invention limited to two-color chips, also encompassing chips produced by three, four or more injections including at least one additional injection of a plastic material a different color from those of the previous injections directly into housings 19 which are defined by the gaps between the projections 18 and can be seen in FIG. 2.

Figure 2:
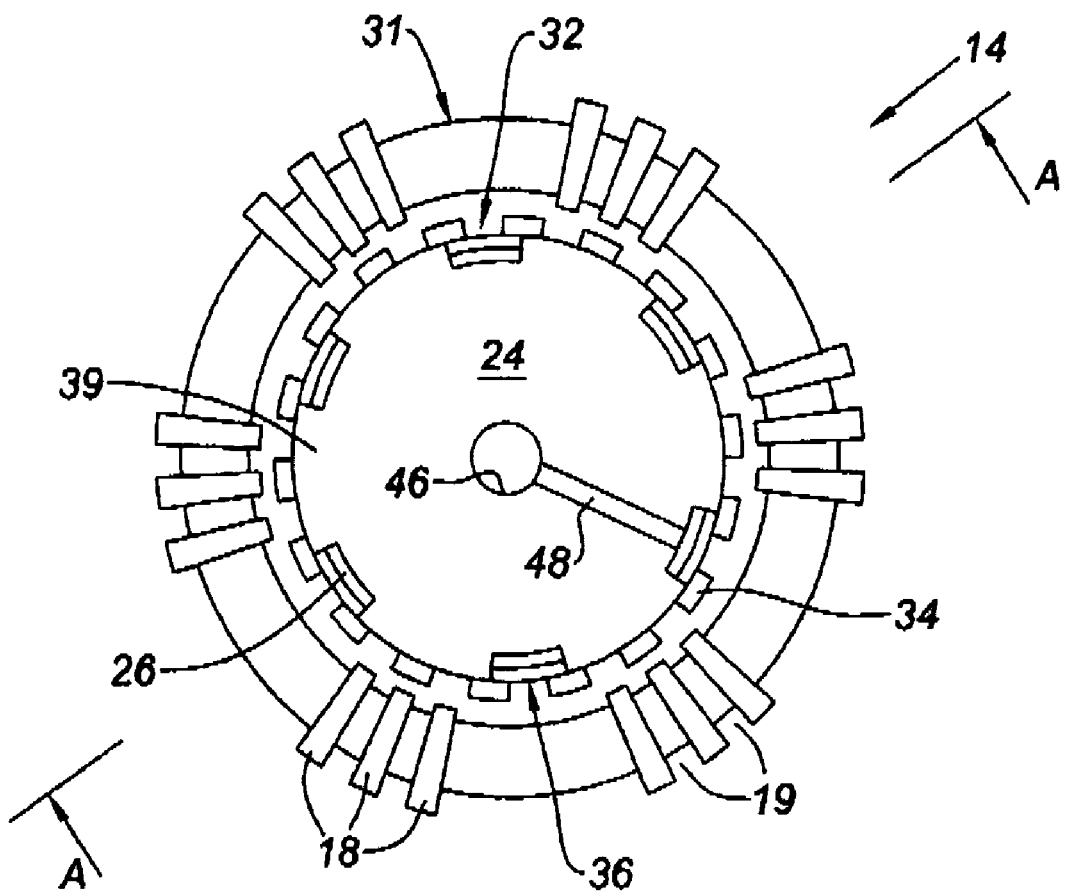
FIG. 2 is a diagrammatic front view of the core of the chip shown in FIGS. 1a and 1b produced by the first injection.
Figure 3:
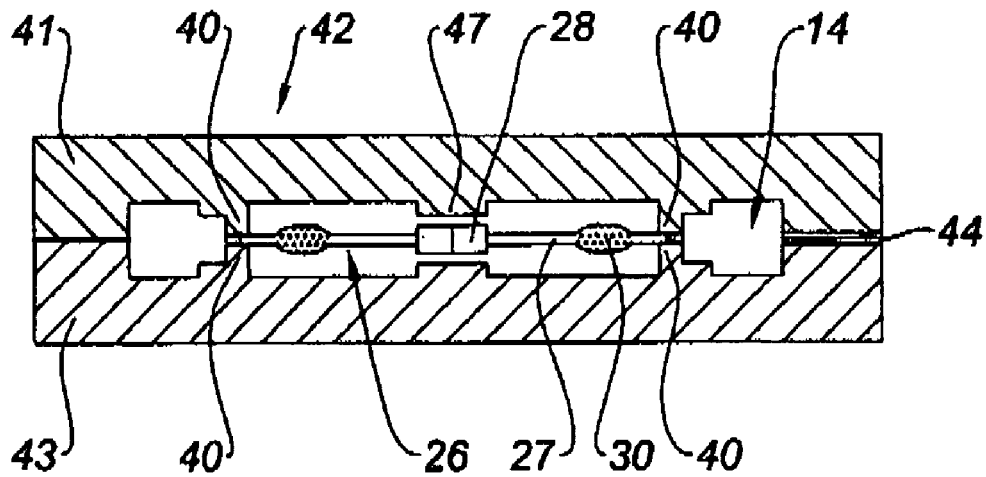
FIG. 3 is a diagrammatic view of the core of the chip shown in FIGS. 1a and 1b in diametric section taken along the line AA, showing the core mounted in the mold for the first injection.

As shown in FIGS. 2 and 3, the core 14 is generally disc-shaped and has a central portion 24 defining the central portion of the chip in which is embedded a circular insert 26 (shown in section in FIG. 3) including the contactless electronic microchip identification device 27 (electronic identifier) consisting primarily of an electronic circuit 28 including a transmitter-receiver and a circular loop antenna 30 disposed around the circuit 28. The electronic identification device 27 including the transmitter-receiver and the peripheral antenna lies between two thin but strong protective films welded together at the periphery to form a rigid or semi-rigid envelope, the insert 26 as a whole taking the form of a thin disc with a maximum thickness of the order of one millimeter and a diameter of the order of 25 mm. The central portion 24 is surrounded by the annular pherpheral portion 31 of the core 14 carrying the projections 18. The innermost part of the portion 31 includes on each face of the chip a circular groove 32 into which open through passages 34 that are evenly distributed in the circumferential direction, the plastic material flowing through these passages 34 during the second injection to improve the attachment of the covering layer 16.

In general terms, the electronic identification device 27 includes an electronic circuit 28 incorporating a programmable read-only memory (PROM) containing information concerning the chip and/or the person or the object associated with the chip, for example a fixed numerical or alphanumerical identification code consisting of 64 bits (including one or more fields, such as: serial number, product, batch or place identification, chip face value, etc.), and an RFID transmitter receiver (part of 28) with a circular peripheral antenna adapted to be supplied with power by inductive coupling from modulated waves coming from a reading station (not shown). In practice, the transmitter-receiver is adapted to exchange data with a reading station (at a distance of 15 cm to 2 m by way of nonlimiting example), without contact, by modulated waves, at an operating frequency from 10 kHz to 20 MHz. The electronic device with memory is used to combat theft and/or to facilitate management and inventory control of a batch of objects in a defined space (storage areas, warehouses, stores), for example. Of course, without departing from the scope of the invention, the electronic identifier device 27 with memory of non-reprogrammable (read-only) type may be replaced by a reprogrammable device so that a changing code can be read and written in memory.

It should be noted that the invention is not limited to this type of thin film protection for the electronic identifier but also relates to the integration of any electronic identifier in a protective enclosure provided that its thickness is compatible with the required final thickness of the chip, in particular electronic identifiers embedded in a disc of hardened resin, in particular of epoxy type, and/or attached to a thin plate of composite material.

The periphery of the central portion 24 of the core 14 includes six evenly distributed openings 36 into which portions of the periphery of the insert 26 project. These openings 36, that here take the form of crenellations, by way of non-limiting example, enable clamping of the periphery of the insert 26 by facing projections 40 on the internal faces of the two half-shells 41, 43 of the first injection mold 42, the latter including at the level of the median joining plane at least one injection orifice 44 facing the edge 20 of the chip. The insert is axially positioned in the mold 42 so that the insert 26 is at a substantially median position at the level of the joining plane. It will be noted that the clamping can be obtained by fixed projections 40 or fingers (as shown in FIG. 3) and/or by mobile projections or fingers in one or both half-shells.

The center of the central portion 24 of the core has a recess 46 on each face. These recesses 46 correspond to two facing projections 47 on the internal faces of the half-shells 41 and 43 that serve as support stops to the electronic identification insert 26 (with a slight clearance) during injection of the core and prevent deformation and/or damage of the insert, with no risk of crushing the electronic circuit. A surface channel 48 is (optionally) provided on each face of the chip between each recess 46 and the corresponding groove 32.

Without departing from the scope of the invention, the location of the openings 36, which are preferably at the periphery of the core, may be shifted to the central portion of the core, taking care to ensure that the insert is retained without deformation and to prevent damage to the circuit 28 and the coil of the antenna.

Figure 4:
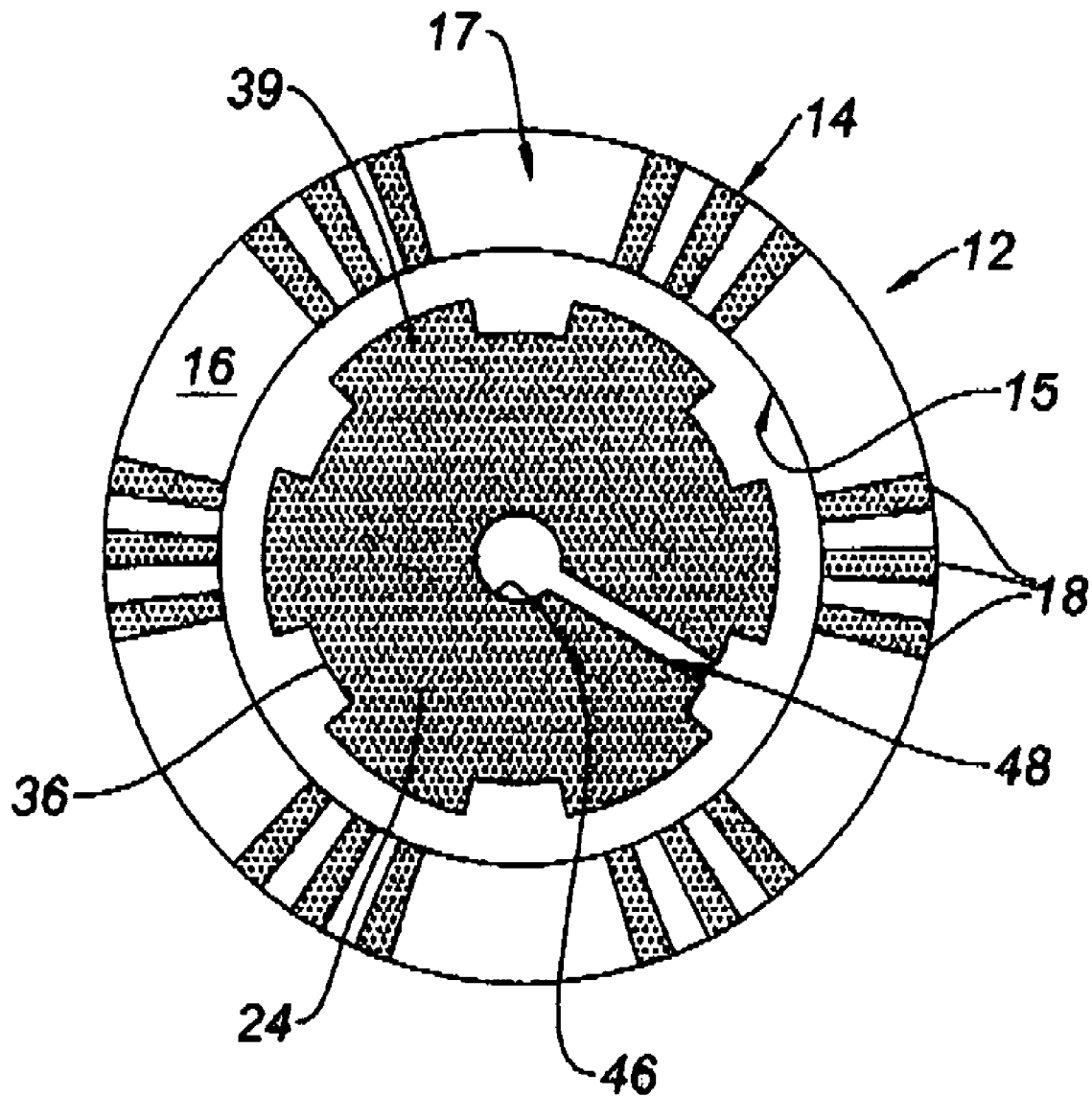
FIG. 4 is a diagrammatic front view of the body of the chip shown in FIGS. 1a and 1b produced by the second injection before applying the face labels.

FIG. 4 shows the body of the chip 12 defined completely or almost completely at the end of the second injection whereby all or almost all of the faces 11 and 13 (in particular the peripheral portion 17 of the body of the chip) and the edge 20 of the chip are defined at least for the most part, the annular peripheral portion 31 of the core 14 being covered by the layer 16 except for the projections 18 (and except for the optional housings 19 between projections in the case of complementary subsequent injection(s) of additional color stripes), the layer from the second injection 16 filling the grooves 32, the openings 36, the through passages 34 and where applicable the recesses 46 and the channels 48, being flush with the central portion 24 of the core 14 to define on each face a shallow (approximately 0.5 mm deep) circular central cavity 15 for housing the decorated plastic material label 22 fixed to the chip (as shown in dashed line in FIG. 1b).

The chips of the invention take the form of a disc, generally with a diameter from 39 to 50 mm and a thickness of the order of 3.3 mm, although these dimensions are not limiting on the invention. The edge of the chip may be chamfered, rounded or have a straight profile, in particular if the edge of the chips is to be read optically. The chamfered or straight profile is finished by grinding or turning on a lathe, if necessary.

The plastic materials used for injecting chips fabricated in accordance with the invention, in particular the gaming chip 10, are obtained from an appropriately charged (in particular in weight and colored materials) basic polymer selected from:
- polymethyl methacrylate (PMMA);
- acrylonitrile-butadiene-styrene (ABS);
- polyamides and copolymers thereof;
- polyacetal and acetal copolymers (POM/polyoxymethylene);
- phenylene polysulfide (PPS);
- poly(alkylenes terephthalate), in particular polybutylene terephthalate (PBT);
- thermoplastic polyurethanes (PUR);
- vinyl polymers, polyvinyl chloride (PVC);
- polyolefins, in particular polyethylenes (PE) and polypropylenes.

By way of nonlimiting example, a 6.6 polyamide is used charged with barite or barium sulfate powder (up to around 60% by weight). Injection is effected at a pressure from 800 to 1400 bar, an injection temperature of 280/300° C. and a mold temperature of around 50° C.

Of course, the compositions may vary, and in particular charges may be incorporated into the materials used for the various injections: for example charges to add weight (barite, metal powders, zinc oxide, etc.) and charges to add color (zinc oxide, etc.) to obtain the color shade selected for each injection.

The invention also relates to a fabrication process for a body 12 of a chip according to the invention, as defined above in all its variants, and including at least the following operations:
- placing an insert 26 including a contactless electronic microchip identification device 27 in a first injection mold 42 two half-shells 41, 43 whereof define a first imprint corresponding to a generally disc-shaped core 14 of the body of the token;
- holding said insert 26 at the center of the first imprint by clamping it between axial projections on the two half-shells of the first mold;
- injecting the core 14 of the token;
- placing the core 14 of the token in a second injection mold, two half-shells whereof define a second imprint corresponding to the whole or almost the whole of the body 12 of the token;
- holding said core at the center of the second imprint by axially clamping the central portion of the core between the two half-shells of the second mold (preferably at the parts 39 of the peripheral area of the central portion 24 of the core between the openings 36 in the form of crenellations so as not to cause the insert 26 and/or the electronic identifier 27 to deteriorate);
- injecting the covering layer 16;
- where applicable, further injection(s) of edge inclusions to complete the body of the token, if necessary; and
- optional machining of the body 12 of the token to finish the edge 20 of the token.

Figure 5:
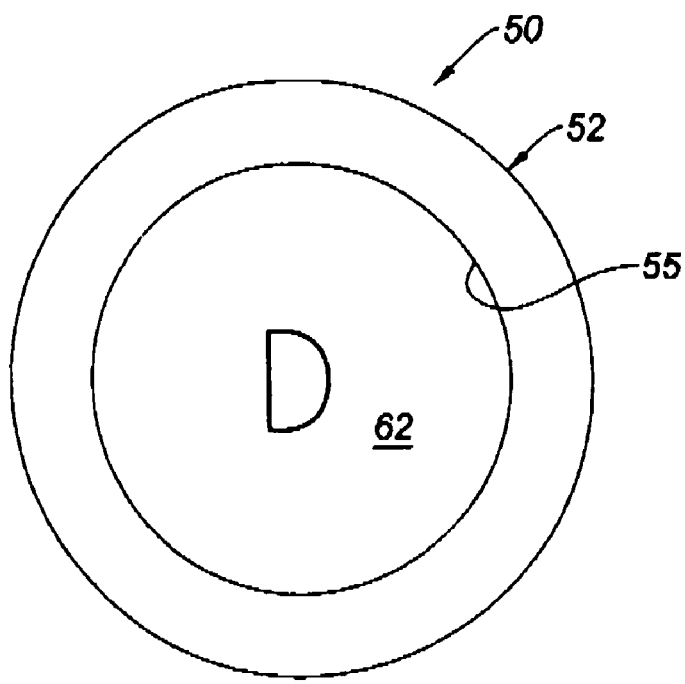
FIG. 5 is a diagrammatic front view of a gaming chip according to a second embodiment of the invention produced by injection of colored plastic material.

In a second embodiment of the invention, the disc-shaped plastic material gaming chip 50 (as described with reference to FIGS. 5 and 6) has a body 52 carrying an insert 66 including a contactless electronic microchip identification device (identical to the device 26 described with reference to FIGS. 2 and 3) produced by a single injection of plastic material. The body 52 of the chip 50 has on each face a shallow central cavity 55 of large diameter (analogous to the cavity 15) and adapted to receive a label 62 (analogous to the label 22) carrying a decoration D.

Figure 6:
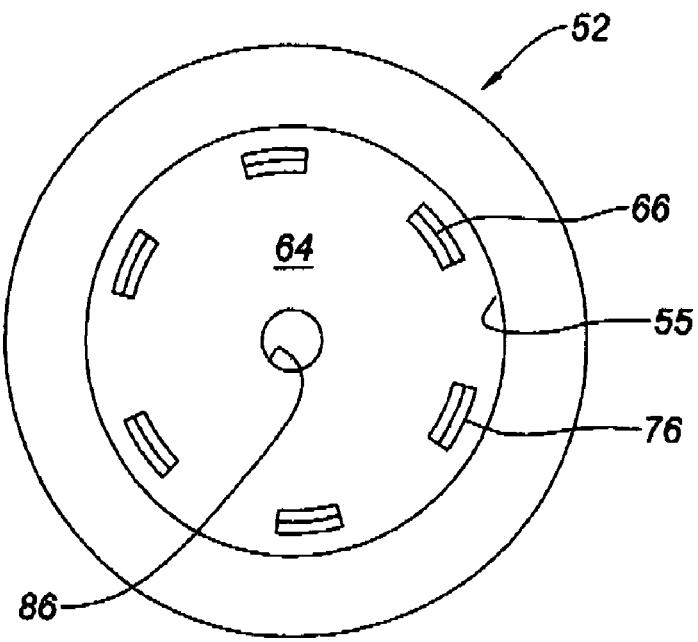
FIG. 6 is a diagrammatic front view of the body of the chip shown in FIG. 5.

As shown in FIG. 6, the peripheral region of the central portion 64 of the body 52 includes six openings 76 (analogous to the openings 36) that are evenly distributed in the circumferential direction and into which project portions of the periphery of the insert 66 and an axial recess 86 (analogous to the recess 46) on each face, the internal faces of the half-shells of the mold (not shown) corresponding to the body 52 having various corresponding projections (analogous to and having the same functions of retaining and protecting the insert 66 as the projections 40 and 47 in relation to the insert 26).

The fabrication process for the chip 50 includes injection of the body 52 with insertion of the contactless electronic identifier insert 66 by operations analogous to those described above for the injection of the core 14, blocking the openings 76, and where applicable the cavities 55, for example with epoxy resin, applying and fixing the labels 62, and where applicable grinding or turning the body 52 of the chip. The plastic material used for the chip 50 may be selected from the above list relating to the chip 10.

Of course, the invention is not limited to gaming chips or casino chips but relates to all types of token in the form of a disc with an injected plastic material body incorporating an electronic identifier, such as parking tokens, payment and countermark tokens and badges for identifying goods or persons, although these examples are not limiting on the invention.

The invention claimed is:

1. A generally disc-shaped token having a body produced by multiple injections of plastic material, the token comprising:
   a generally disc-shaped single-piece core of the body of the token produced by a first injection of plastic material and having a central portion defining the central portion of the body of said token and an annular peripheral portion defining at least part of an edge of said body of the token; and
   a covering layer produced by a second injection of plastic material around the peripheral portion of the core to produce in conjunction with the core one of, all or almost all of the edge and of the annular peripheral portion of the body of the token,
   wherein the core of the token incorporates an insert embedded in the plastic material of the central portion of said body during the first injection and comprising a contactless electronic microchip identification device, wherein said insert is secured between a first half-shell and a second half-shell of a first injection mold during said first injection of plastic material such that said resulting generally disc-shaped single-piece core is a single-piece construction with said insert being embedded within said plastic material of the central portion of said body of said core upon completion of said first injection.

2. The token according to claim 1, wherein, in the first injection, the core defines at least part of the annular peripheral portion of the body of the token.

3. The token according to claim 2, wherein, in the first injection, the core defines at least part of the annular peripheral portion of the token and the edge of the token by way of radial peripheral projections that are grouped.

4. The token according to claim 3, wherein the radial peripheral projections that are grouped are evenly distributed in a circumferential direction and extend on either side of said body and axially over the edge.

5. The token according to claim 2, wherein, in the first injection, the core defines at least part of the annular peripheral portion of the token and the edge of the token by way of radial peripheral projections that are not grouped.

6. The token according to claim 5, wherein the radial peripheral projections that are not grouped are evenly distributed in a circumferential direction and extend on either side of said body and axially over the edge.

7. The token according to claim 1, wherein, in conjunction with the core, said covering layer defines the annular peripheral portion and the edge of the body of the token except for housings provided with injected plastic material edge inclusions produced by at least one complementary injection.

8. The token according to claim 1, wherein a peripheral region of the central portion of the core comprises a plurality of openings into which project portions of an insert which comprises said electronic microchip identification device.

9. The token according to claim 8, wherein the core comprises at least three openings evenly distributed in a circumferential direction at the periphery of the central portion of the core.

10. The token according to claim 8, wherein said portions of the insert projecting through openings in the core are sufficiently strong to hold the insert in place during injection of the core of the body of the token.

11. The token according to claim 8, wherein a center of the central portion of the core has at least one recess on at least one of its faces.

12. The token according to claim 8, wherein an internal portion of said peripheral portion of the core comprises a circular groove including through passages that are evenly distributed in a circumferential direction.

13. The token according to claim 12, wherein at least one of (a) said openings, (b) any recesses in the faces of the token and (c) said through passages are filled with plastic material by said second injection.

14. The token according to claim 1, wherein the body of the token has on each face a cavity into which is fixed a label carrying at least one of a decoration, a mark and a hologram.

15. The token according to claim 1, wherein the token is produced by injecting plastic materials of different colors.

16. The token according to claim 1, wherein said token comprises colored plastic materials obtained from at least one basic polymer selected from the group consisting of polymethyl methacrylate (PMMA);
   acrylonitrile-butadiene-styrene (ABS);
   polyamides and copolymers thereof;
   polyacetal and acetal copolymers (POM/polyoxymethylene);
   phenylene polysulfide (PPS);
   polyalkylene terephthalates;
   thermoplastic polyurethanes (PUR);
   vinyl polymers; and
   polyolefins.

17. The token according to claim 16, wherein the polyalkylene terephthalates is polybutylene terephthalate (PBT), the vinyl polymers are polyvinyl chloride (PVC), and the polyolefins are at least one polymer selected from the group consisting of polyethylenes (PE) and polypropylenes.

18. The token according to claim 1, comprising a body produced by injection of plastic material and having a diameter one of, greater than or equal to 39 mm and a maximum thickness that does not exceed 3.3 mm, the thickness of the central portion of the body being of the order of 2.5 mm.

19. The token according to claim 1, wherein the token is one of a gaming chip or a casino chip.

20. A generally disc-shaped token having a body produced by multiple injection of plastic material, the token comprising at least:
   a generally disc-shaped single-piece core of the body of the token produced by a first injection of plastic material and having a central portion defining the central portion of the body of said token and an annular peripheral portion defining at least part of an edge of said body of the token; and
   a covering layer produced by a second injection of plastic material around the peripheral portion of the core to produce in conjunction with the core one of, all or almost all of the edge and of the annular peripheral portion of the body of the token,
   wherein the core of the token incorporates an insert embedded in the plastic material of the central portion of said body during the first injection and comprising a contactless electronic microchip identification device and wherein said insert is secured between a first half-shell and a second half-shell of a first injection mold during said first injection of plastic material such that said resulting generally disc-shaped single-piece core is a single-piece construction with said insert being embedded within said plastic material of the central portion of said body of said core upon completion of said first injection;
   in the first injection, the core defines at least part of the annular peripheral portion of the body of the token;
   in conjunction with the core, said covering layer defines the annular peripheral portion and the edge of the body of the token except for housings provided with injected plastic material edge inclusions produced by at least one complementary injection;

a peripheral region of the central portion of the core comprises a plurality of openings into which project portions of an insert which comprises said electronic microchip identification device;

the core comprises at least three openings evenly distributed in a circumferential direction at the periphery of the central portion of the core; and the body of the token has on each face a cavity into which is fixed a label carrying at least one of a decoration, a mark and a hologram.

21. A method of fabricating a body of a token comprising:

placing an insert comprising a contactless electronic microchip identification device in a first injection mold, two half-shells whereof define a first imprint corresponding to a generally disc-shaped core of the body of the token;

holding said insert at a center of the first imprint by axially clamping the insert between the two half-shells of the first mold;

injecting the core of the token;

placing the core of the token in a second injection mold, two half-shells thereof defining a second imprint corresponding to one of all or almost all of the body of the token;

holding said core at a center of the second imprint by axially clamping a central portion of the core between the two half-shells of the second mold; and injecting a covering layer.

22. The method according to claim 21, wherein at least one of the clamping during the first injection and the second injection is realized at a peripheral area of the central portion of the core of the token.

23. The method according to claim 21, further comprising at least one further injection of edge inclusions to complete the body of the token.

24. The method according to claim 21, further comprising machining the body of the token to finish the edge of the token.

* * * * *